United States Patent
Weingarten

(10) Patent No.: US 6,724,384 B2
(45) Date of Patent: Apr. 20, 2004

(54) SYSTEM AND METHOD FOR ORGANIZATION AND DELIVERY OF DATA FOR VIRTUAL WALKTHROUGHS

(75) Inventor: Donald H. Weingarten, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 09/858,412

(22) Filed: May 16, 2001

(65) Prior Publication Data

US 2002/0171645 A1 Nov. 21, 2002

(51) Int. Cl.[7] .............................................. G06T 15/50
(52) U.S. Cl. ........................ 345/426; 345/423; 345/427
(58) Field of Search ................................. 345/423, 427, 345/426

(56) References Cited

U.S. PATENT DOCUMENTS

| | | |
|---|---|---|
| 6,009,188 A | 12/1999 | Cohen et al. |
| 6,023,523 A | 2/2000 | Cohen et al. |
| 6,097,394 A | 8/2000 | Levoy et al. |

Primary Examiner—Mark Zimmerman
Assistant Examiner—Adam Arnold
(74) Attorney, Agent, or Firm—Stephen C. Kaufman; Jose Gutman; Fleit, Kain, Gibbons, Gutman, Bongini & Bianco, P.L.

(57) ABSTRACT

A method in an imaging system organizes and compresses into segments of limited size the image collection needed for the application of image based rendering to walkthroughs of large objects. For views from a limited range of positions only a corresponding limited segment of data needs to be transmitted, decompressed, and processed. A savings is thereby obtained in the startup time and memory required for execution of a walkthrough.

41 Claims, 12 Drawing Sheets

SYSTEM AND METHOD FOR ORGANIZATION AND DELIVERY OF DATA FOR VIRTUAL WALKTHROUGHS

BACKGROUND OF THE INVENTION

1. Field of the Invention

This invention generally relates to the field of image processing systems, and more particularly relates to a system and method for organizing and delivering data for virtual walkthroughs.

2. Description of Related Art

Computer-based user-steered interactive display of a sequence of views of a 3-dimensional scene is potentially of value in a wide range of applications. A key goal of a system for such a "walkthrough" is providing a seemingly-real sequence of images. Reaching this goal for a large scene typically requires great computer power.

Specifically, from a visual model combined with a specification of light sources, viewing position, and viewing angle, a corresponding image can be rendered by the method of ray-tracing or by other well-established algorithms. The data set needed to specify with realistic detail a visual model of a large object, either real or synthetic, such as an industrial building, a ship or a passenger jet may include tens or even hundreds of millions of triangles. For a walkthrough of such scenes and objects to seem real images of the scenes and objects from the walker's sequence of positions and viewing angles must be rendered at a rate of more than 20 frames per second. Slower rates of frame update yield a jerky, unrealistic appearance. A brute force computer algorithm for constructing a walkthrough might consist of applying one of the well-established rendering algorithms repeatedly to generate each successive view frame. Present rendering algorithms, however, require sufficiently large amounts of computation that when applied on present hardware to produce views of a large model, the required rendering rate of over 20 frames per second can not nearly be reached.

The heavy computational burden of a direct application of ray-tracing to a large visual model occurs in part because this method must examine each triangle in the model to determine whether it is visible from the chosen viewing position and angle. Thus many triangles which do not contribute to the final image may nonetheless be the subject of computation. In addition, for a very detailed model viewed from at least a moderate distance, even triangles which contribute to the final image may each be so small that their contribution is solely to a single pixel. Thus viewed from a moderate distance, a large model may impose the computation of visual details which are not visible in the final image.

A possible means of improving the efficiency of interactively driven viewing of a large object is the method of image based rendering. In place of a triangulated model, image based rendering begins with a collection of images of the object to be viewed. From a finite collection of images, an image from an arbitrarily chosen position and viewing angle is then constructed. For a real object the image collection can be captured from reality. For a synthetic object it can be generated using ray-tracing in an initial preparatory step completed before a walkthrough and having, therefore, no effect on the execution speed the walkthrough itself. Images in the input collection which contribute to the output image are, in effect, close enough to the output image that the determination of the output image entails no calculations corresponding to the elimination of invisible triangle and invisible details encountered in direct ray-tracing.

Recent advances in the method of image based rendering are the subject of U.S. Pat. No. 6,097,394 by M. Levoy and P. Hanrahan, and U.S. Pat. Nos. 6,023,523 and 6,009,188 by M. Cohen, S. Gortler and R. Szeliski. These patents concern primarily isolated objects bounded, for example, by a box and viewed from outside the bounding box. The image collections produced by each of these methods when compressed for convenient transmission and storage turns into either a single or a small number of large coherent units. Applied to the walkthrough of a building with many rooms these methods require the transmission and decompression of a data object of size comparable to the full compressed image collection of the entire building before the viewing of even a single image of a single room in the building. It would be desirable to have a system of image based rendering for walkthroughs which is free of this limitation.

Therefore a need exists to overcome the problems with the prior art as discussed above, and particularly for efficient organization, delivery, and rendering of image data for walkthroughs.

SUMMARY OF THE INVENTION

A preferred embodiment of the present invention provides a means of organizing and compressing into segments of limited size the image collection needed for the application of image based rendering to walkthroughs of large objects. For views from a limited range of positions only a corresponding limited segment of data needs to be transmitted, decompressed, and processed. A savings is thereby obtained in the startup time and memory required for execution of a walkthrough.

A method comprises the steps of: covering a region for walkthrough with at least one closed surface, wherein each point in the region is surrounded by at least one closed surface; dividing each of the at least one closed surface into a plurality of patches such that each point of each of the at least one closed surface is contained within at least one patch; providing a representation of a collection of light rays crossing each patch of the plurality of patches in a direction oriented toward the interior of a corresponding closed surface using methods drawn from image based rendering; and for any selected viewing point and viewing angle within a region for walkthrough, constructing a corresponding visible image by methods drawn from image based rendering applied to the representation of the collection of light rays crossing at least one patch of at least one closed surface surrounding the selected viewing point.

According to a preferred embodiment of the present invention, a system comprises: a network; at least one networked computing device; and a computer server, communicatively coupled via the network with the at least one networked computing device, for sending imaging information from the computer server into the network destined for reception by the at least one networked computing device, the computer server comprising: a memory for storing imaging information comprising: a representation of a collection of light rays for each of a plurality of patches constituting at least one closed surface covering a region for walkthrough; and an image server, electrically coupled to the memory, for selecting at least one representation of a collection of light rays crossing at least one patch of the plurality of patches of one of the at least one closed surface of the region for walkthrough, wherein the selected at least one representation of a collection of light rays includes all light rays needed for the image based rendering of a visible image at a selected point and viewing angle.

According to an alternative preferred embodiment, the system further comprises: an image component distributor, electrically coupled to the image server, for sending into the network the selected at least one representation of a collection of light rays destined for reception by, and for rendering the visible image at, the at least one networked computing device.

According to another alternative preferred embodiment, the size of the at least one closed surface is selected to be a small size relative to the region for walkthrough so that the representation of a collection of light rays for each patch of each surface can be kept to within a predetermined size constraint.

According to another alternative preferred embodiment, the at least one networked computing device comprises: a user interface for presenting imaging information to and receiving navigation commands from a user navigating a walkthrough; and a memory for storing a user-selected viewing point and viewing angle within a region for walkthrough, and imaging information comprising: a representation of a collection of light rays for each of a plurality of patches constituting at least one closed surface within a region for walkthrough and surrounding the selected viewing point; and an image client, electrically coupled to the memory, for determining in the course of a walkthrough for which of the at least one closed surface within the region of walkthrough and for which patches of the at least one closed surface within the region for walkthrough a representation of the collection of light rays should be retrieved from the server, wherein the retrieved representations of collections of light rays are selected to insure that the light ray collections present in the memory of the networked computing device includes all light rays needed for the image based rendering of a visible image at a selected point and viewing angle.

According to another alternative preferred embodiment, the networked computing device further comprises: an image component receiver, electrically coupled to the image client, for requesting and receiving from the network the representations of collections of light rays destined for the memory of the networked computing device.

According to another alternative preferred embodiment, the networked computing device further comprises: an image renderer, electrically coupled to the memory, for constructing by the methods of image based rendering from the collections of light rays present in the memory the visible image at the selected point and viewing angle.

Further, according to another alternative preferred embodiment, a computer readable medium contains computer instructions for a system for performing the new and novel operations according to the present invention.

BRIEF DESCRIPTION OF THE DRAWINGS

FIG. 2 is a cutaway view of an exemplary room scene and objects to be walked through.

DESCRIPTION OF THE PREFERRED EMBODIMENTS

Figure 1:
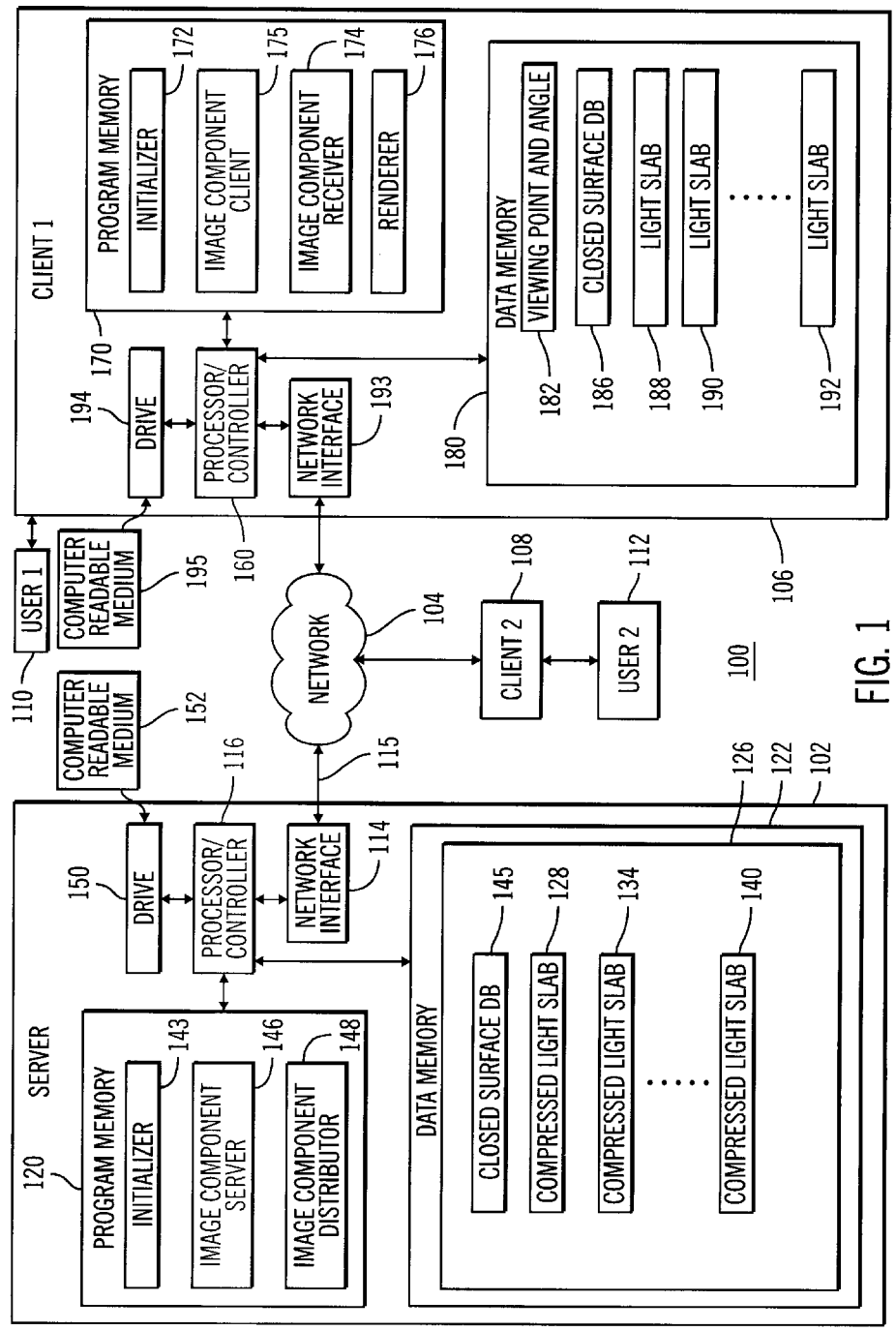
FIG. 1 is a block diagram illustrating an exemplary image processing system for rendering walkthroughs in accordance with a preferred embodiment of the present invention.

The present invention, according to a preferred embodiment, overcomes problems with the prior art by providing a computer-based method for 3-dimensional imaging of a large scene and/or object from any position and any viewing angle in a region of empty space within or surrounding the scene and/or object. Note that the terms "scene" and "object" may be used interchangeably herein when discussing the objects and surfaces viewable from within a region relating to a virtual walkthrough. The image of an object seen from any such position or viewing angle consists of a set of light rays emerging from the object and oriented in the direction toward the viewing position.

For any closed surface surrounding a viewing position and containing no piece of the object viewed, all light rays passing from the viewed object to the viewing position must pass through the closed surface. A preferred embodiment of the present invention covers a region from which viewing is to occur with a set of closed surfaces, such that the volume enclosed by each does not intersect the volume enclosed by any other. Each surface is then divided into a set of patches. For each such patch, the set of all light rays from the viewed object toward each point in the patch can preferably be represented using a conventional method such as discussed in U.S. patent application No. 6,097,394, on Aug. 1, 2000, by Levoy et al., and as discussed in U.S. patent application No. 6,009,188, on Dec. 28, 1999, by Cohen et al., and further as discussed in U.S. patent application No. 6,023,523, on Feb. 8, 2000, by Cohen et al., the collective teachings of which being hereby incorporated by reference. The resulting data set is referred to as a "light slab" or "lumigraph". From the light slab for each patch, all light rays from the viewed object directed toward any point in the patch can be recovered. From the set of all light rays for all patches covering a closed surface, the image of the object seen from any point surrounded by the closed surface can be constructed. From the set of all patches for all closed surfaces covering the region to be walked through, all images of the object visible during a walkthrough may be recovered. The set of all light slabs for all patches of all surfaces needed for walkthroughs of an object taken together with a database specifying the position in space of all such surfaces and patches we will refer to as a "light catalog" for that object.

An important feature of the present invention, not available in prior art systems and methods for rendering images for virtual walkthroughs, is that no matter how large a region is to be walked through, by partitioning this region into sufficiently many closed surfaces, the resulting surfaces and the patches into which they are divided may each be made small and therefore the total number of words of data in the light slab corresponding to each may also be kept small. The size of the at least one closed surface can be selected to be a small size relative to the region for walkthrough so that the representation of a collection of light rays for each patch of each surface can be kept to within a predetermined size constraint. This is a significant advantage of the present invention.

An alternative preferred embodiment of the present invention would enclose a region to be walked through with a single large closed surface, then divide the large surface into many small patches and form a light slab from the light rays arriving at each of these patches. If each patch were chosen small enough, the amount of data in its corresponding light slab would also be small. To form the full image visible from a particular angle at a particular point within the region enclosed by the surface, however, would require the light rays crossing the surface at typically half of the points of the surface. Thus light rays would be needed from typically half of the light slabs in the light catalog. Thus even though each light slab itself would be small, the data which would have to be retrieved from the light catalog to form a single image would remain large for a walkthrough of a large object.

Referring to FIG. 1, an exemplary imaging system 100 is shown, in accordance with a preferred embodiment of the present invention. An imaging data server 102 is communicatively coupled, via a communication link 115, to a network 104. The network 104 may comprise any one or a combination of a local area network or a wide area network, communicatively coupled via wired and/or wireless communication. The communication link 115 may comprise wired and/or wireless communication. According to the present example, the network 104 comprises a wide area network such as the Internet. At least one networked device, such as illustrated by a first networked client computing device 106 and a second networked client computing device 108, is communicatively coupled to the network 104. The first networked client computing device 106 is used by a first user 110 and the second networked client computing device 108 is used by a second user 112. The first user 110 can be communicating via a first user interface (not shown) with the first networked device 106, and the second user 112 can be communicating via a second user interface (not shown) with the first networked device 106. A user interface may comprise user input interfaces and user output interface for the respective user of the user interface. For example, a user output interface may comprise a graphical display and a user input interface may comprises a keyboard and/or a mouse. The system components and functions of a user interface, such as can be used to interface with a user 110, 112, for walkthroughs is well known to those of ordinary skill in the art.

The server 102 is communicatively coupled with the at least one networked device 106, 108, via a network interface 114 and via the network 104. The server 102 comprises a processor/controller 116 that is communicatively coupled to the network interface 114. The processor/controller 116 is also communicatively coupled to a program memory 120 and to a data memory 122. The program memory includes computer instructions for operating the server 102. The data memory 122 includes storage for parameters and data for providing walkthrough imaging information to the at least one networked device 106, 108. The processor/controller 116 is also communicatively coupled to a removable media drive 150 that can receive a computer readable medium 152, such as a floppy disk, a CD-ROM disk, or a CD-RW disk, for delivering program instructions and/or data to/from the server 102. The processor/controller 116, for example, can transfer program instructions from a CD-ROM 152 to the program memory 120, and can transfer data from the CD-ROM 152 to the data memory 122. Additionally, the processor/controller 116 can transfer program instructions and/or data to a CD-RW disk 152 from the program memory 120 and/or the data memory 122, respectively. The server 102, therefore, can transfer in information and can transfer out information via computer readable medium 152 for facilitating performing walkthroughs in the system 100 as will be discussed in more detail below.

The data memory 122 includes a light catalog 126 for the object to be viewed in a walkthrough. The light catalog 126 typically comprises: a closed surface data base 145 specifying the location in space of the at least one closed surface covering the region to be walked through and the location in space of the plurality of patches covering the at least one closed surface; and a plurality of sets of light rays, stored as compressed light slabs 128, 134, 140, giving the collection of light rays associated with each patch. The closed surface database 145 includes also, associated with each patch of each closed surface, a pointer to the location in memory 122 of the corresponding compressed light slab 128, 134, 140.

The program memory 120, according to the present exemplary embodiment, includes an image component server 146. The image component server 146, in response to a request from a networked computing device 106 for image data from a particular patch of a particular closed surface of the region of walkthrough uses the closed surface database 145 in data memory 122 to determine the location of the corresponding image data stored as a compressed light slab, for example one of the compressed light slabs 128, 124 or 140, in the server's data memory 122. The program memory 120 includes also an image component distributor 148. The image component distributor 148 takes a compressed light slab, for example, one of the compressed light slabs 128, 134, or 140, and transmits it over the network 104 to the networked computing device 106 issuing a request for image data. The program memory 120 includes also an initializer 143 that transmits to a networked client device 106 the data needed only at the start of a walkthrough to be traversed by a user, such as user1 110 or user2 112.

FIG. 1 also illustrates a detailed view of the components of an exemplary networked computing device, such as the client device 106. Corresponding components exist in device 108 but are not shown in FIG. 1. Note that although the networked computing devices 106, 108, in this example are shown as client devices, any combination of the networked computing devices 106, 108, could be configured generally as computing devices in communication with the central computing device illustrated as a server 102 in this example. Thus networked computing devices 106, 108 and 102 need not be implemented as networked clients and server, respectively. Device 106 comprises a processor/controller 160 that is communicatively coupled to a network interface 193 for communicating with the network 104. The processor/controller 160 is also communicatively coupled to a program memory 170 and to a data memory 180. The program memory 170 includes computer instructions for operating the client 106. The data memory 180 includes storage for parameters and data for providing walkthrough imaging information needed to display the visible image through an interface, not shown, to the user 110 executing (e.g., navigating) the walkthrough.

The user interface (not shown) of the client device 106 also receives commands from the user 110 by which the user 110 controls changes in viewing position and viewing angle as the user 110 navigates a walkthrough. The user interface (not shown) for example may include user output interfaces such as a visual display, an indicator that can comprise means for visible indication, audible indication, and tactile indication. The user output interface may also include a speaker for generating audible sounds for the user. Additionally, the user interface (not shown) may include user input interfaces for accepting input from a user, such as via a keyboard, a mouse, a tablet and stylus, touch pad, and means for accepting other user input such as is well known to those of ordinary skill in the art.

The data memory 180, according to the present example, includes a viewing point and angle memory 182 which keeps track of the present position and viewing orientation of the user 110 navigating a walkthrough. The data memory 180 also includes a closed surface database 186 specifying the location in space of the at least one closed surface enclosing the region to be walked through and the location in space of the plurality of patches covering the at least one closed surface.

In addition, according to the present example, the data memory 180 includes a set of patch image data stored as uncompressed light slabs, for example, the illustrated light slabs 188, 190, 194. The collection of such uncompressed light slabs typically includes uncompressed forms of only a faction of the set of compressed light slabs, for example, the illustrated compressed light slabs 128, 134, 140, of the light catalog 126 in the data memory 122 of the server 102. The closed surface database 186 includes also, associated with each patch of each closed surface, a flag indicating whether the corresponding light slab is present in client data memory 180 and, if present, a pointer to the location in memory of the corresponding light slab, for example, 188, 190, 194.

The program memory 170 includes an image component client. As the position of the path in a walkthrough approaches the current closed surface surrounding the current position and as the position of the path in a walkthrough crosses the current closed surface and enters a region surrounded by a new closed surface, the imaging component client 175 determines what next action may be needed to keep current the necessary imaging information, for example, 188, 190, 192, in the data memory 180. The program memory 170 includes also an image component receiver 174 that sends requests for image components to the server 102 and receives back the resulting data. The program memory includes, in addition, a render 176 which, by the methods of image based rendering, constructs from the current position and viewing angle record 182, from the closed surface data base 186 and from the light slabs, for example 188, 190, 192, the image visible at the current viewing point and viewing angle 182. The program memory includes also an initializer 172 that, at the start of a walkthrough, sends requests to the server 102 for data required to determine the initial state of the data memory 180.

Preferred operations of the server 102, its components, and of a networked client, for example, 106 will be described in more detail below.

Figure 2:
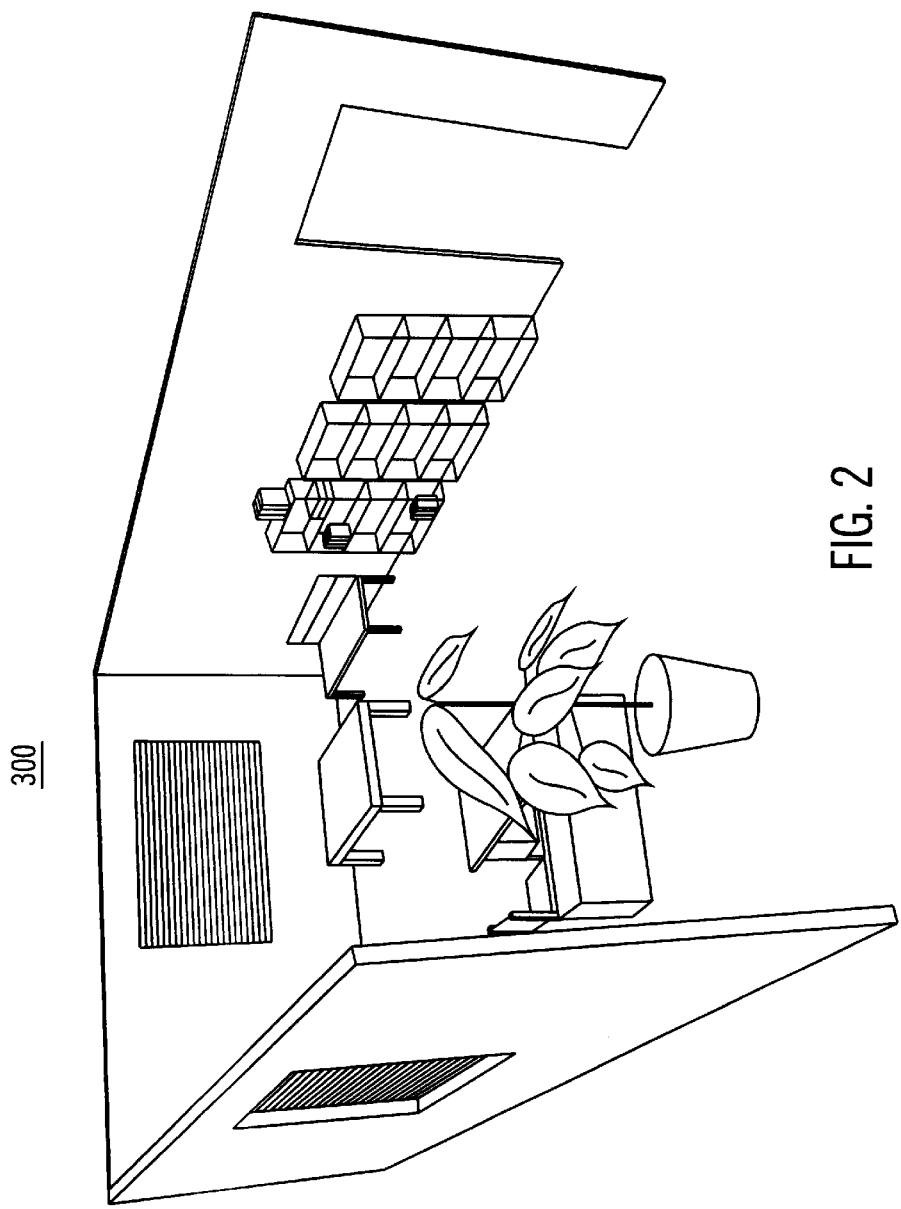
Figure 3:
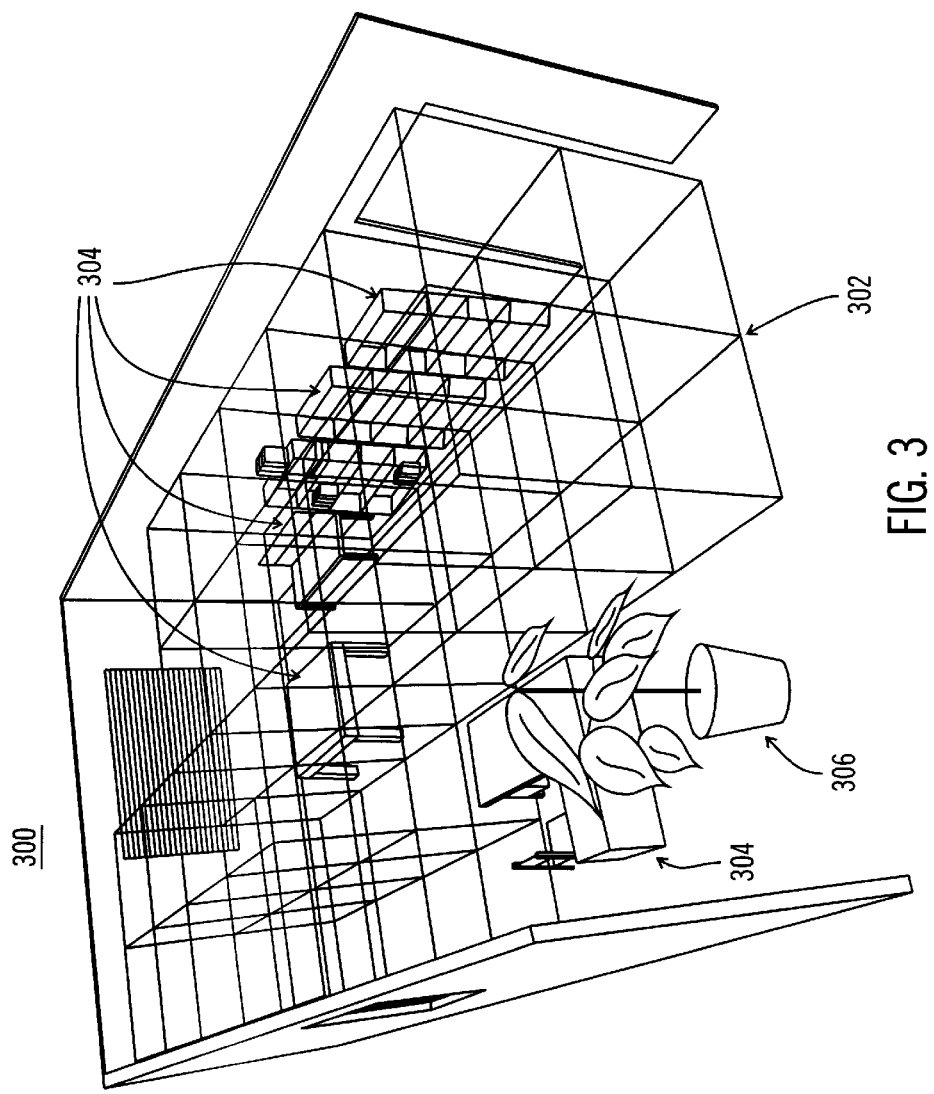
FIG. 3 is a cutaway view of the room of FIG. 2, showing a division of region to be walked through into exemplary rectangular cells, according to a preferred embodiment of the present invention.

First of all, for an example of the construction and use of a light catalog, FIG. 2 shows a cutaway view of a room scene 300 to be walked through by a user, such as by user1 110 on networked computer 106. FIG. 3 shows an exemplary partitioning of a large region of the room scene 300 into a set of non-overlapping rectangular boxes 302. Each of these rectangular boxes defines a closed surface covering a region for walkthrough. In view of the discussion herein, it will be appreciated by those of ordinary skill in the art that other closed surface shapes can be used within the scope of the present invention.

Figure 4:
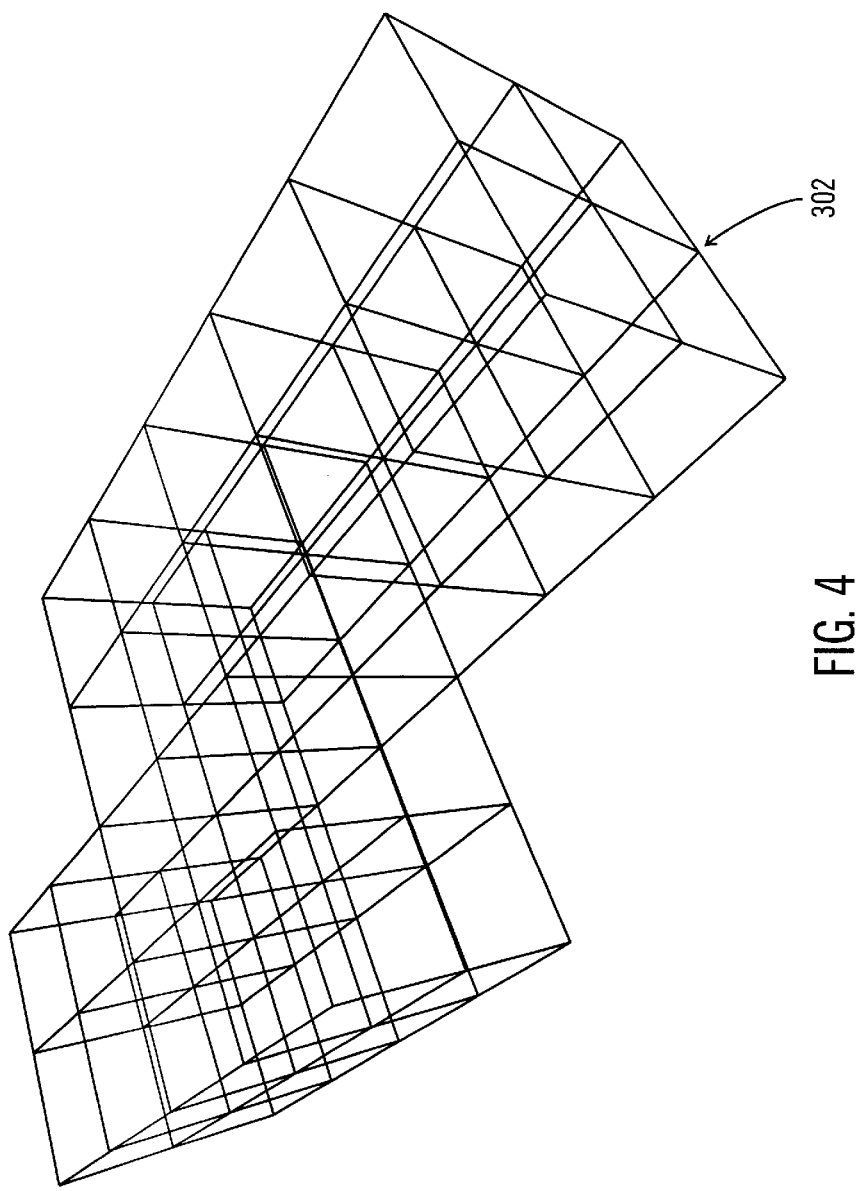
FIG. 4 is a view of the rectangular cells of FIG. 3 with the room deleted for clarity of discussion.

The region covered by the boxes 302 of FIG. 3 includes nearly all of the room 300 outside of the furniture 304 and the potted plant 306. A still larger region could be covered by adding additional boxes in the small regions near each piece of furniture 304 not covered by the partitioning shown in FIG. 3. For simplicity of discussion, we do not consider this more detailed covering. FIG. 4 shows the set of boxes 302 of the partitioning itself with other elements of the room scene 300 omitted from the figure.

For each of the six rectangular faces of each of the boxes 302 in FIG. 4 (also seen in FIG. 3), a light slab is created from the rays coming in toward the box from any part of the room 300 outside of the particular box. These light slabs preferably are created following one of the following methods such as discussed in U.S. patent application No. 6,097, 394, on Aug. 1, 2000, by Levoy et al., and as discussed in U.S. patent application No. 6,009,188, on Dec. 28, 1999, by Cohen et al., and further as discussed in U.S. patent application No. 6,023,523, on Feb. 8, 2000, by Cohen et al., the collective teachings of which being hereby incorporated by reference. Thus, for each box of FIG. 4 (also as seen in FIG. 3) a total of six light slabs are constructed. These light slabs can then be compressed for efficient storage by any of several well-established compression methods. For example, a conventional image compression method, such as discussed by U.S. patent application No. 6,097,394, on Aug. 1, 2000, by Levoy et al., may be useful for certain applications. According to the present exemplary embodiment of the present invention, the set of all such compressed light slabs, 132, 138, 144, stored in records 128, 134, 140, respectively, forms the image data component of the light catalog 126 for the room 300.

Figure 5:
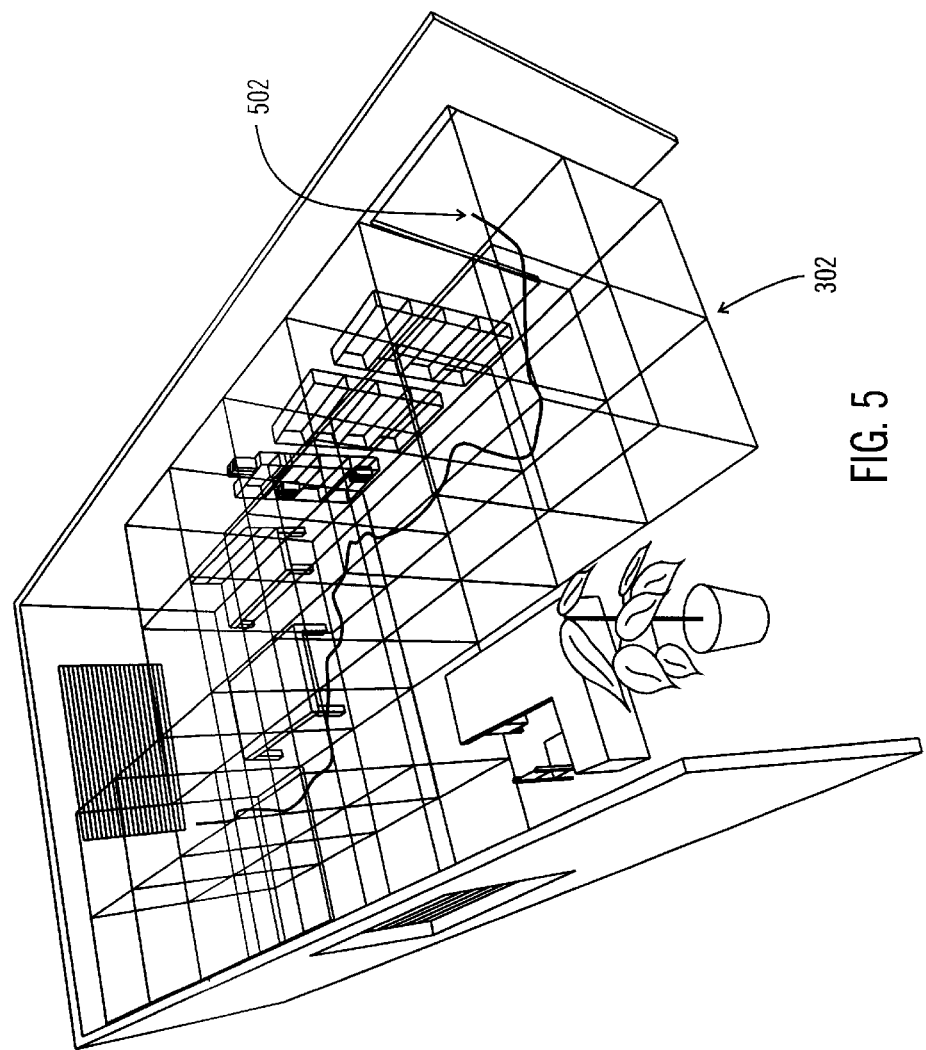
FIG. 5 is a view of the rectangular cells of FIG. 3 illustrating an exemplary trajectory path of a possible walkthrough.
Figure 6:
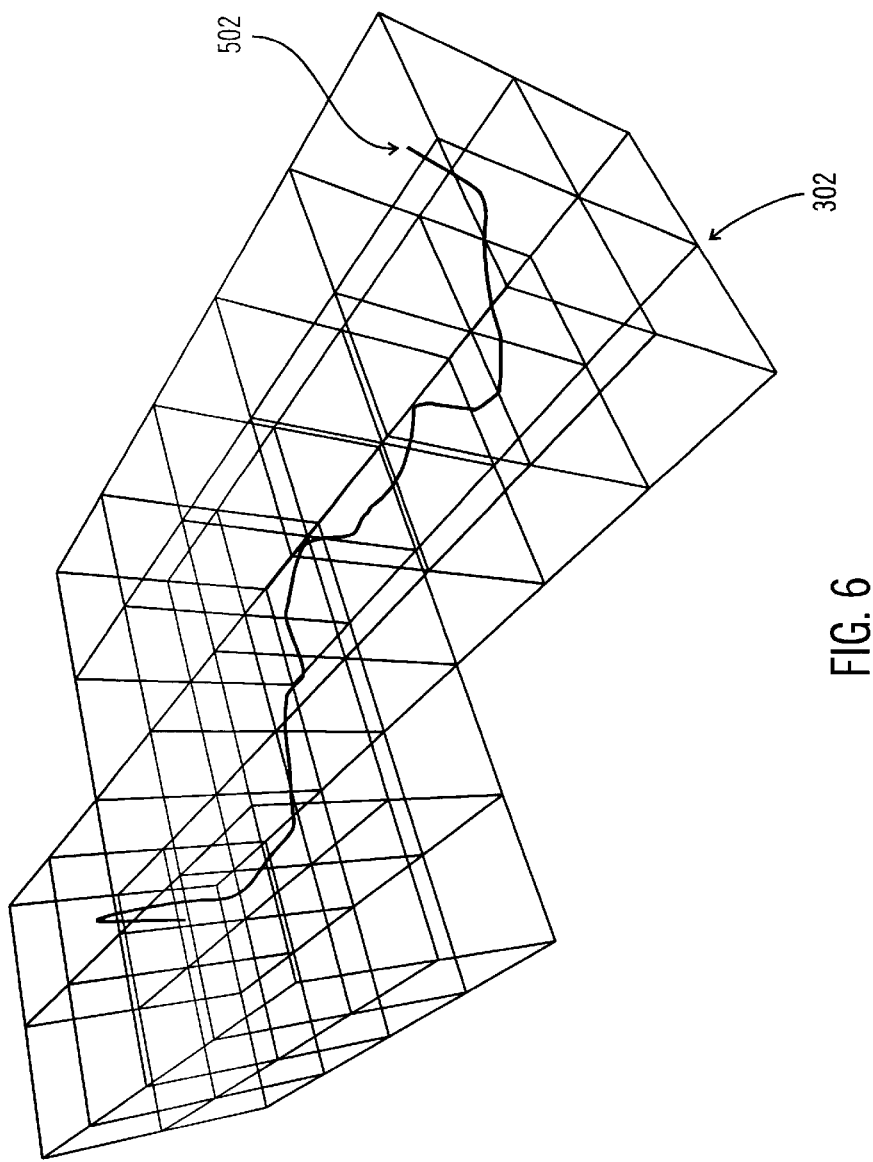
FIG. 6 is a view of the rectangular cells of FIG. 5 illustrating the exemplary trajectory path of a possible walkthrough, with the room deleted for clarity of discussion.
Figure 7:
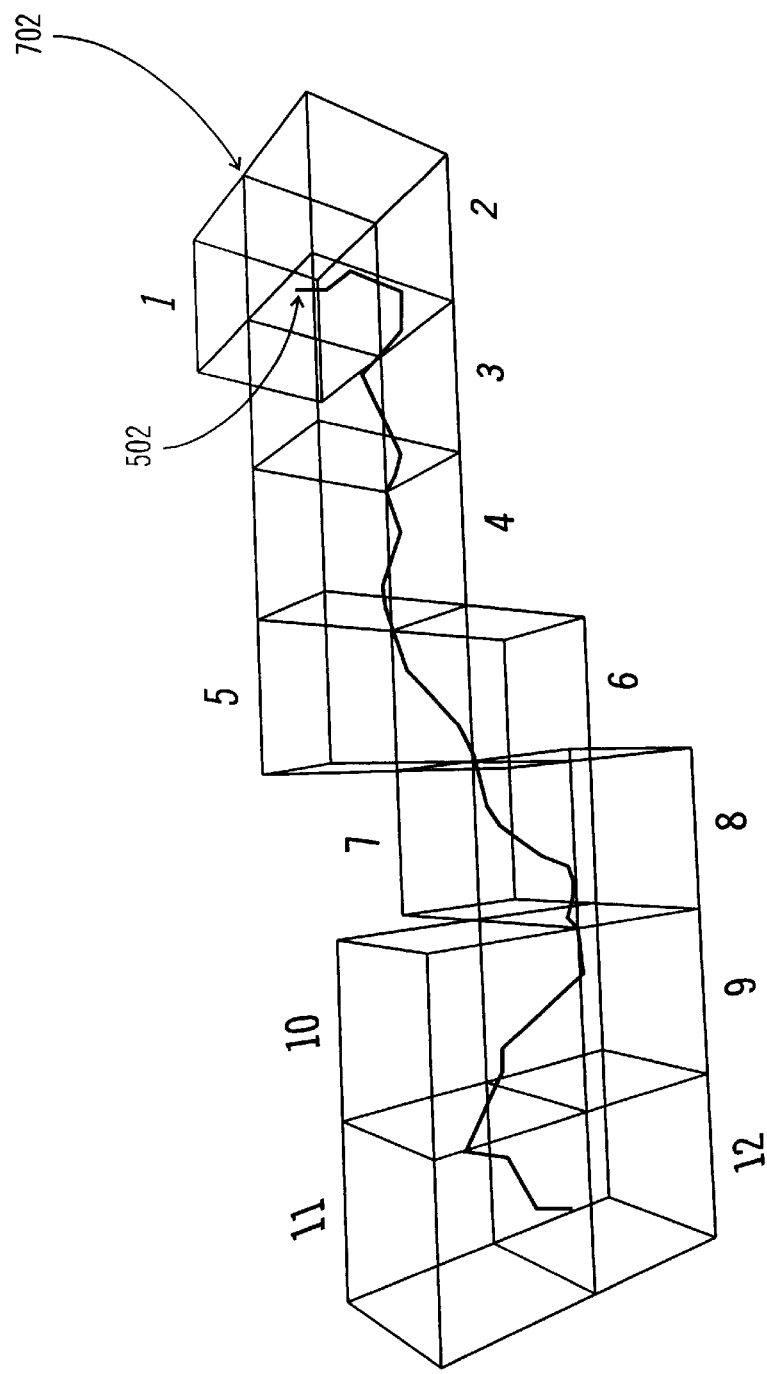
FIG. 7 is a view of the rectangular cells of FIG. 5 illustrating the exemplary trajectory path of a possible walkthrough, showing only cells actually crossed and being numbered in the order of crossing, and with the room and the remaining cells deleted for clarity of discussion.

FIG. 5 shows an exemplary walkthrough trajectory path 502 crossing various of the boxes of the partitioning. FIG. 6 shows the path 502 as it crosses boxes from the set of boxes 302 of the partitioning by themselves with the other elements of the room 300 omitted from the figure. FIG. 7 shows only the walkthrough path 502 and those boxes that the path actually crosses. The set of boxes 702 of FIG. 7 are also shown numbered in the order in which the path 502 crosses them.

Figure 8:
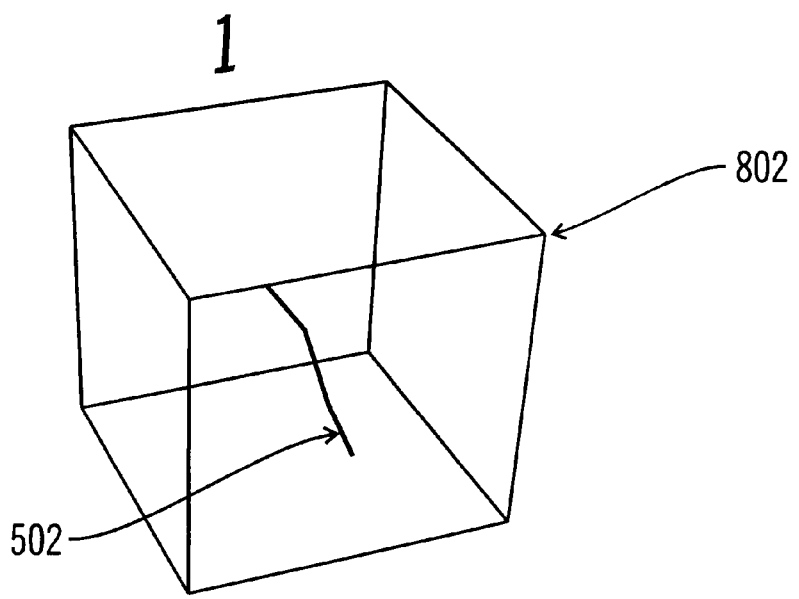
FIG. 8 is a view of the beginning of the exemplary trajectory path of FIG. 7 showing only cell 1.

FIG. 8 shows the beginning of the exemplary walkthrough trajectory path 502 starting in box number one 802 of the set of numbered boxes 702 shown in FIG. 7. At the beginning of a walkthrough by a user, for example by user1 110, the image component client 175 determines from the closed surfaces boundaries database 182 that the six light slabs forming the boundary of box one 802 must be fetched from the light catalog 126 and stored in uncompressed form in the data memory 180. The light catalog 126 itself may be present in a memory 122, such as either RAM or hard disk storage.

Each of these six light slabs are then delivered to, and decompressed at, the networked device 106, that is rendering the image information for a user 110, navigating a walkthrough. From the decompressed light slabs, following conventional methods of image based rendering as discussed in U.S. patent application No. 6,097,394, on Aug. 1, 2000, by Levoy et al., and as discussed in U.S. patent application No. 6,009,188, on Dec. 28, 1999, by Cohen et al., and further as discussed in U.S. patent application No. 6,023,523, on Feb. 8, 2000, by Cohen et al., the renderer 176 of the remote networked computing device 106, can construct the image visible at any viewing angle from any point on the segment of path 502 contained in the box one 802.

Figure 9:
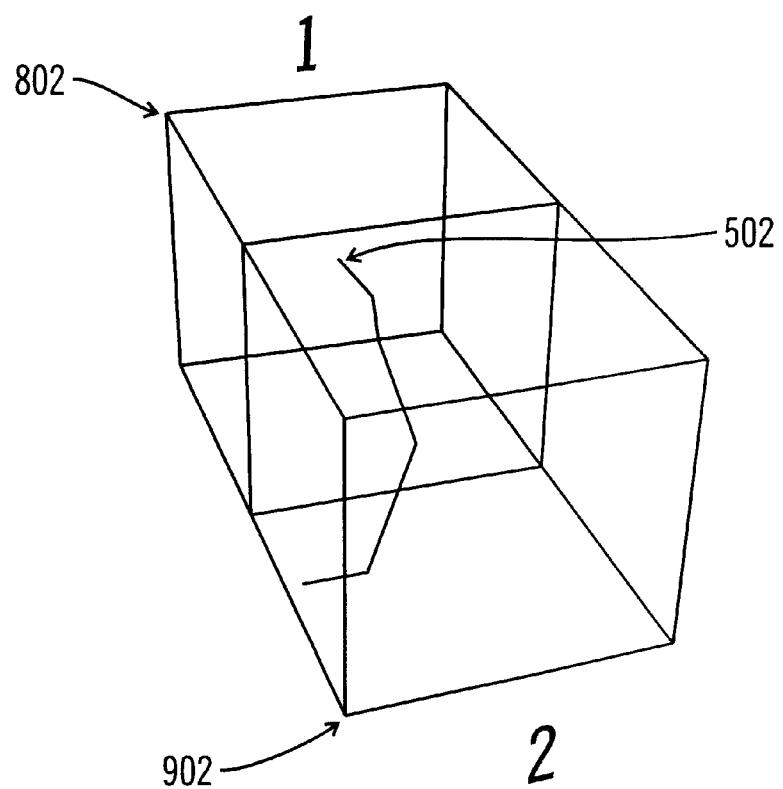
FIG. 9 shows the progress of the exemplary trajectory path through cells 1 and 2.

FIG. 9 shows the continuation of the walkthrough path 502 from box one 802 into box two 902. When box two 902 is entered by the path 502, according to the present example, five light slabs will be fetched from the light catalog 126, decompressed and stored in data memory 180. One light slab is needed for each of the five faces of box two 902 that are not shared with box one 802. The light rays which would be obtained from the light slab for the face of box two 902 shared with box one 802 can be recovered, according to one alternative preferred embodiment of the present invention, from the five light slabs for the faces of box one 802 not shared with box two 902. These five light slabs have already been fetched from the light catalog 126 and then decompressed and stored in memory 180 in the client networked computer 106 while the walkthrough path 502 was in box one 802.

Figure 10:
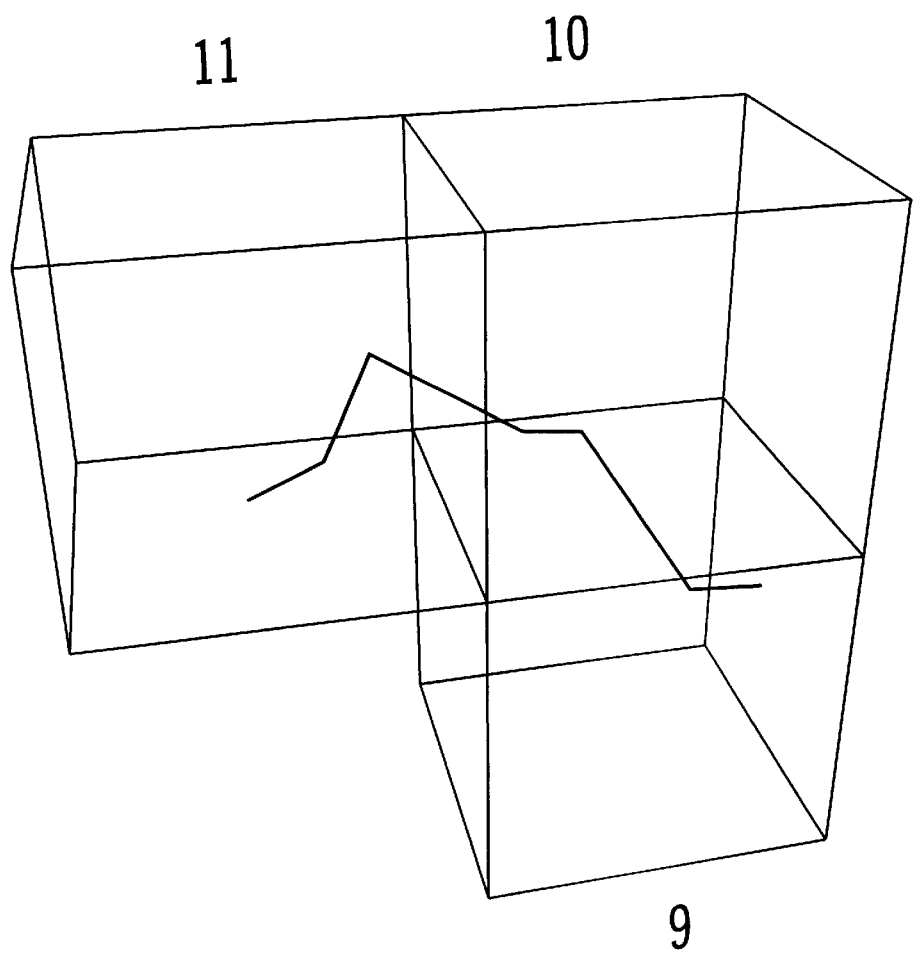
FIGS. 10 and 11 show portions of the exemplary trajectory path through cells 9, 10, 11, and 12.
Figure 11:
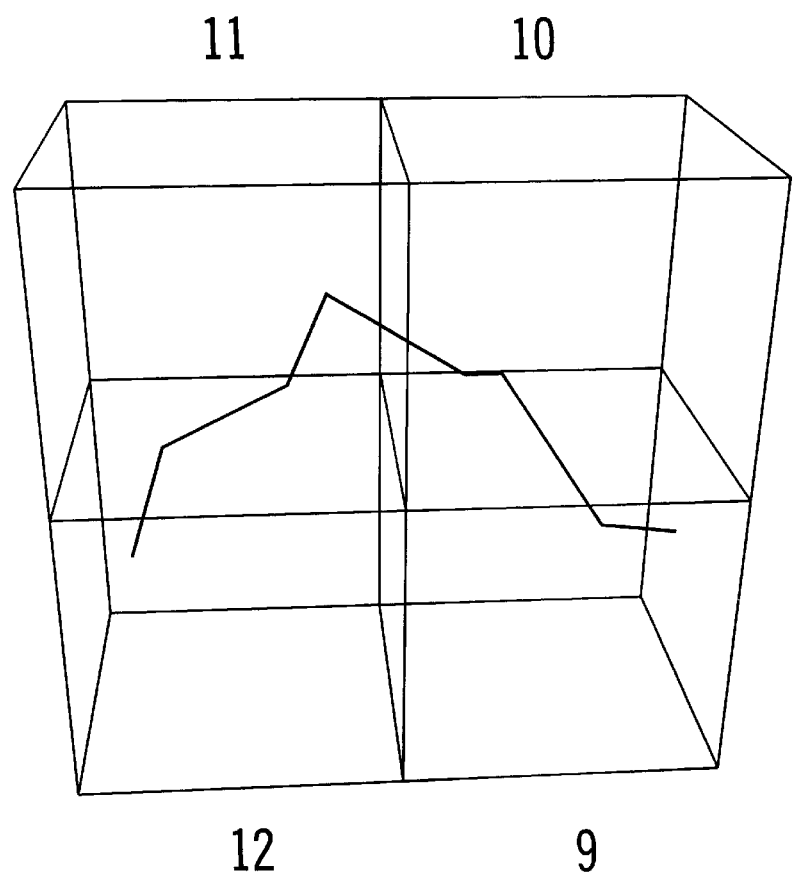

Referring to FIGS. 7 thru 11, as each new box is entered while the walkthrough path 502 continues into boxes 3, 4, 5, 6, 7, 8, 9, 10 and 11, five new light slabs must be fetched from the light catalog, one for each of the five faces of the newly entered box which are not shared with the box the path just left. FIG. 10 shows the segment of the walkthrough path 502 crossing boxes 9, 10 and 11, with the preceding segment of the path 502 and the boxes it crossed omitted for simplicity. FIG. 11 shows the segment of the path 502 in box 12 along with the preceding segment in boxes 9,10 and 11. When the path 502 enters box 12 only four new light slabs must be fetched, rather than five. The four light slabs needed are those for the faces of box 12 not shared with boxes 9 and 11. The light rays that would be taken from the light slab for the faces shared with boxes 9 and 11 can be obtained from light slabs already fetched from the light catalog and decompressed while the path was in boxes 9 and 11.

According to an alternative preferred embodiment of the present invention, an improvement in the efficiency of constructing walkthrough images from a light catalog 126 is obtainable by an image component client 175 attempting to guess in advance when the walkthrough path 502 is soon to enter a new box. As soon as a new box is anticipated and before the new box is actually entered, the image component client 175 can request anticipated light slabs that will be needed for the new box. The anticipatory fetching of light slabs can be started and run in parallel task with the rendering process for the present box.

Since the task of fetching light slabs from a light catalog 126 is, in general, likely to be slow in comparison to the task of rendering new images, and since the hardware involved in such a fetch is largely distinct from the rendering hardware, executing the tasks of fetching and rendering in parallel is likely to speed the overall walkthrough computation for the system 100.

A variety of well-established methods exist for guessing when entry of a new box is likely. One method is to make such a guess whenever the walkthrough path 502 comes sufficiently close to the face of an as yet unentered box. Another alternative method is to make a smooth fit to the preceding walkthrough path 502 and predict entry of a new box by extrapolation of the fit. Still another alternative method is to collect data on user behavior from actual walkthroughs and use it to optimize parameters in one of the preceding two methods of guessing. The image component client 175, image component receiver 178, image component server 146 and image component distributor 148 can interoperate with, for example, the renderer 176 and according to any combination of the predictive methods discussed immediately above for more efficient handling in parallel the tasks of delivering the needed walkthrough information from server 102 to client 106 and rendering the walkthrough image to the user interface for user1 110.

Figure 12:
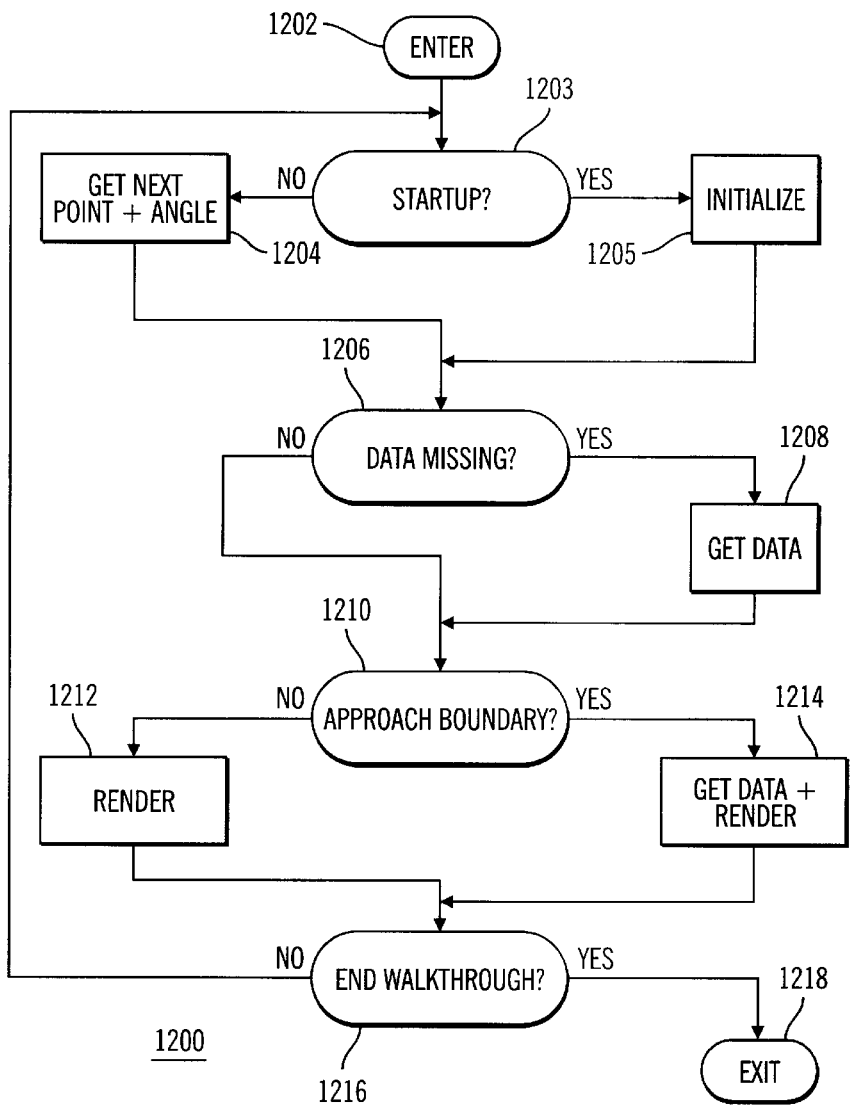
FIG. 12 is an operational flow diagram illustrating an exemplary operational sequence for the image processing system of FIG. 1, according to a preferred embodiment of the present invention.

Referring to FIG. 12, a flow diagram 1200 illustrates an operational sequence for the system 100 of FIG. 1 using the light catalog method of constructing images for a walkthrough to be executed, for example, by user1 110 on networked client computer 106. The system 100 enters the operational sequence, at step 1202, and executes on networked computer 106. On startup, at step 1203, the networked computer 106 goes to initialize the imaging for walkthrough, at step 1205. At step 1205, the computer system 106 passes control to the client initializer 172 which requests data from the server to initialize the viewing point and angle 182, and the closed surface database 186. In the closed surface database's initial state, the flags associated with each patch of each of the more than one closed surfaces are set to indicate that no light slabs, 188, 190, 192, are present in data memory 180. On subsequent iterations of the operational sequence, at step 1203, the networked computer 106 takes the branch, at step 1204, in which a viewing point and angle are input to the networked computer 106 by the user1 110. This information is then stored in the viewing point and angle memory 182 of the networked computer 106.

On completion of either initializaion, at step 1205, or getting a next viewing point and angle, at step 1204, the system 100 then determines, at step 1206, whether image data is missing. This task is performed under the control of the image component client 175. For the exemplary path 502, at startup, the position and viewing angle are initialized in box one 802 as shown in FIG. 8. Under the control of the image component client 175, the system then determines that light slabs corresponding to the six rectangular faces of box one 802 are missing from data memory 180 and must be requested from the image component server 146. On subsequence iterations of the operational sequence, for positions and viewing angles still within box one 802 and not yet approaching a boundary of box one 802, the image component client 175 determines that no further light slabs need to be requested. While the walkthrough does not approach a boundary of the current box, in this example illustrated as box one 802, the system 100 continues to render, at step 1212, the images for the walkthrough without having to get additional data from the light catalog 126. In step 1212 the current image is rendered under control of renderer 176. On subsequent iterations in which the system 100 determines, at step 1210, that a boundary of the current box, such as box one 802, is approached, the system 100 gets the data needed for imaging, and then renders images for the walkthrough, at step 1214. Anticipated image data retrieval and current image rendering are executed as described previously. When the walkthrough continues, at step 1216, the system 100 repeats looping of the operational sequence 1200. When the walkthrough is completed, at step 1216, the system exits the operational sequence 1200, at step 1218.

As the walkthrough path 502 becomes longer, all light slabs fetched from the light catalog 126 can be saved in local client memory, for example as illustrated by data memory 180 in the networked computing device 106, and can be used to construct new views. Alternatively, if this process of saving uncompressed light slabs eventually exhausts available local memory in the networked computing device 106, the collection of all of the old saved light slabs can be erased from local memory on entering a new box in the walkthrough path 502.

On entering a new box or if step 1210 anticipates the entering of a new box, for example, a full set of six new light slabs, including a light slab for the face shared with the immediately preceding box, can be fetched from the light catalog 126 in the server 102 just as six light slabs are fetched at the start of a walkthrough as shown in FIG. 8. Such an imaging restart step, although requiring an increase in communication traffic across the network 104, i.e., from the server 102 that comprises the light catalog 126 in memory 122 to the at least one networked device 106, 108, will save computation resources at the networked computing device 106, 108. Since a full set of six new light slabs are delivered to the at least one networked device 106, 108, no reconstruction at the device 106, 108, will be necessary. The additional processing overhead needed for reconstruction of missing light slabs at the networked device 106, 108, will not be needed and can be used for rendering image information for the user 110, 112. Additionally, by not storing a lengthy history of light slabs in local memory, the networked device 106, 108, will save local memory. This allows the networked device 106, 108, to provide image rendering for walkthroughs with less local memory than otherwise might be used in other alternative embodiments of the system 100.

As shown in FIG. 9, for the path segment in box two 902, less computation resource would be required to recover light rays needed for an image by working from the single light slab for the face that box two 902 shares with box one 802, than would be required to recover these same light rays working from the set of five light slabs for the faces of box one 802 not shared with box two 902. In general, whether at any point in a walkthrough it is best to replace several old light slabs with one new light slab depends on details of the software and hardware of a particular implementation of the light catalog method, as will be appreciated by those of ordinary skill in the art in view of the present discussion.

According to a preferred alternative embodiment of the present invention, a light slab reconstruction feature for a system 100 can provide efficient storage and delivery of walkthrough information for a system 100 even with limited memory storage and/or with limited bandwidth for a communication channel for delivery of the walkthrough information. In certain systems 100, a client networked computing device 106, 108, that is running the walkthrough application for a user 110, 112, may include a limited amount of memory thereby limiting the amount of walkthrough information that can be stored at any time. Further, a communication channel, such as for a communication link 115 and/or a network 104, may experience a limited communication bandwidth thereby limiting the amount of walkthrough information that can be delivered from the server 102 maintaining the light catalog 126 to a client networked computing device 106, 108, that is running the walkthrough application for a user 110, 112. In such systems 100, a reconstruction of light slab information as necessary may be a valuable feature, as will be discussed in more detail below.

According to the example shown in FIG. 9, as a walkthrough path 502 enters box two 902 from box one 802, the system 100, according to the present alternative embodiment, reconstructs the light slab on the interface of box two 902 being shared with box one 802. The system 100 uses as input for the reconstruction the light slabs on the five remaining faces of box one 802 that are stored in memory in the networked computing device 106, 108. Such a reconstruction is possible since every light ray which enters box two 902 through its face shared with box one 802 must also cross one of the other faces of box one 802 not shared with box two 902. A reconstruction collects the available information from the other five light slabs that is stored in memory and reconstructs the information representing the light slab for the face that is not previously stored in memory in the networked computing device 106, 108.

A reconstruction reduces the amount of memory required in the networked computing device 106, 108, and avoids an additional light slab fetch communication from the server 102 that carries the light catalog 126. This is a significant advantage of the present reconstruction feature that is not available in known prior art walkthrough systems. Additional computation will be needed, however, to perform the reconstruction in the networked computing device 106, 108. Depending on alternative implementations of the system 100 hardware and software, such a reconstruction feature may or may not be favored over the previously discussed method of storing in memory at a networked computing device 106, 108, the old light slabs and fetching a new light slab as needed from the light catalog 126 at the server 102.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

According to an alternative preferred embodiment, as is appreciated by one of ordinary skill in the art in view of the discussion above, functional components embodied in the present invention may reside all in one computer system that renders the walkthrough for users of the computer system. For example, a client device, such as client1 device 106 may generally be representative of a computer system that could present image information to a user for navigating a walkthrough.

According to the alternative preferred embodiment, the image component server 146 and the renderer 176 may reside in the same program memory of a computer system, such as in the program memory 170 of the client device 106. Similarly, the light catalog 126 and the uncompressed light slabs 188, 190, 192, being used to render the walkthrough may reside in the same data memory of a computer system, such as in the data memory 180 of the client device 106. A user interface, communicatively coupled to the computer system, presents images to a user navigating a walkthrough via the computer system. Accordingly, functions of the server 102 and client 106, as discussed above, can optionally be realized combined in a single computer system, where the communication across a network 104 would be replaced, for example, by communication in the computer system, such as via an internal communication channel and/or via an internal bus.

The advantages of the present invention, as discussed above for distributed users across a network 104 using networked computer devices, are likewise experienced by users of a single computer system. Users experience, for example, more efficient communication across a communication channel in the computer system and more efficient use of memory storage, consequently providing enhanced overall system performance with limited system resources. This is a significant advantage not available in known prior art imaging systems.

The processor/controller 160, according to the present alternative preferred embodiment, can be also communicatively coupled to a removable media drive 194 that can receive a computer readable medium 195, such as a floppy disk, a CD-ROM disk, or a CD-RW disk, for delivering program instructions and/or data to/from the single computer system, such as the client device 106. The processor/controller 160, for example, can transfer program instructions from a CD-ROM 195 to the program memory 170, and can transfer data from the CD-ROM 195 to the data memory 180. Additionally, the processor/controller 160 can transfer program instructions and/or data to a CD-RW disk 195 from the program memory 170 and/or the data memory 180, respectively. The computer system, such as illustrated in this example by the client device 106, therefore, can transfer in information and can transfer out information via computer readable medium 195 for facilitating performing walkthroughs by a user.

The present invention can also be embodied in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method comprising the steps of:
   covering a region for walkthrough with at least one closed surface, wherein each point in the region is surrounded by at least one closed surface;
   dividing each of the at least one closed surface into a plurality of patches such that each point of each of the at least one closed surface is contained within at least one patch;
   providing a representation of a collection of light rays crossing each patch of the plurality of patches in a direction oriented toward the interior of a corresponding closed surface using methods drawn from image based rendering, wherein the representation of a collection of light rays for each patch being kept to within a predetermined size constraint; and
   for any selected viewing point and viewing angle within a region for walkthrough, constructing a corresponding visible image by methods drawn from image based rendering applied to the representation of the collection of light rays crossing at least one patch of at least one closed surface surrounding the selected viewing point.

2. The method of claim 1, further comprising the step of:
   delivering, via a network, to a networked computer the representation of the collection of light rays of at least one patch of at least one closed surface surrounding the selected viewing point.

3. The method of claim 2, further comprising the step of:
   constructing, at the networked computer using methods drawn from image based rendering, the visible image at the selected viewing point and viewing angle from the delivered representations of the collections of light rays crossing patches where the collection of patches is sufficiently large to include all light rays needed for an image construction task.

4. The method of claim 1, wherein each of the at least one closed surface is of an arbitrarily chosen size.

5. The method of claim 1, wherein the size of the at least one closed surface is selected to be a small size relative to the region for walkthrough so that the representation of a collection of light rays for each patch of each surface can be kept to within a predetermined size constraint.

6. The method of claim 1, wherein the at least one closed surface is covered with a plurality of patches that are disjoint from one another and only intersecting at their boundaries.

7. The method of claim 1, wherein the region for walkthrough is covered with a plurality of closed surfaces such that the volume enclosed by each does not intersect the volume enclosed by any other.

8. The method of claim 7, wherein each of the plurality of closed surfaces comprises a rectangular solid.

9. The method of claim 8, wherein each of the plurality of closed surfaces is divided into six patches that comprise six rectangular boundaries for the rectangular solid.

10. The method of claim 9, wherein the size of the at least one closed surface is selected to be a small size relative to the region for walkthrough so that the representation of a collection of light rays for each patch of each surface can be kept to within a predetermined size constraint.

11. The method of claim 1, wherein the at least one closed surface comprises at least one rectangular solid.

12. The method of claim 11, wherein the at least one closed surface is divided into a plurality of patches that comprise six rectangular boundaries for the at least one rectangular solid.

13. The method of claim 12, wherein each of the at least one closed surface is divided into six patches that comprise the six rectangular boundaries for each of the at least one rectangular solid.

14. The method of claim 13, wherein the size of the at least one closed surface is selected to be a small size relative to the region for walkthrough so that the representation of a collection of light rays for each patch of each surface can be kept to within a predetermined size constraint.

15. A system comprising:
a network;
at least one networked computing device; and
a computer server, communicatively coupled via the network with the at least one networked computing device, for sending imaging information from the computer server into the network destined for reception by the at least one networked computing device, the computer server comprising:
   a memory for storing imaging information comprising:
      a closed surface database including at least one representation of at least one closed surface, respectively, being located in a region for walkthrough; and
      a representation of a collection of light rays for each of a plurality of patches constituting the at least one closed surface covering the region for walkthrough; and
   an image server, electrically coupled to the memory, for selecting at least one representation of a collection of light rays crossing at least one patch of the plurality of patches of one of the at least one closed surface of the region for walkthrough, wherein the selected at least one representation of a collection of light rays includes all light rays needed for the image based rendering of a visible image at a selected point and viewing angle.

16. The system of claim 15 further comprising:
an image component distributor, electrically coupled to the image server, for sending into the network the selected at least one representation of a collection of light rays destined for reception by, and for rendering the visible image at, the at least one networked computing device.

17. The system of claim 15 wherein the at least one networked computing device constructs a visible image at the selected viewing point and viewing angle from the selected at least one representation of the collection of light rays by using methods drawing from image based rendering.

18. The system of claim 15, wherein each of the at least one closed surface is of an arbitrarily chosen size.

19. The system of claim 15, wherein the size of the at least one closed surface is selected to be a small size relative to the region for walkthrough so that the representation of a collection of light rays for each patch of each surface can be kept to within a predetermined size constraint.

20. The system of claim 15, wherein the region for walkthrough is covered with a plurality of closed surfaces such that the volume enclosed by each does not intersect the volume enclosed by any other.

21. The system of claim 20, wherein each of the plurality of closed surfaces comprises a rectangular solid.

22. The system of claim 21, wherein each of the plurality of closed surfaces is divided into six patches tat comprise the six rectangular boundaries for the rectangular solid.

23. The system of claim 22, wherein the size of each of the plurality of closed surfaces is selected to be a small size relative to the region for walkthrough so that the representation of a collection of light rays for each patch of each surface can be kept to within a predetermined size constraint.

24. A computer server system comprising:
a network interface;
an processor/controller, communicatively coupled to the network interface, for sending imaging information from the computer server system via the network interface to at least one networked computing device;
a memory for storing imaging information comprising:
   a closed surface database including at least one representation of at least one closed surface, respectively, being located in a region for walkthrough; and
   a representation of a collection of light rays for each of a plurality of patches constituting the at least one closed surface covering the region for walkthrough; and
an image server, electrically coupled to the processor/controller and to the memory, for selecting at least one representation of a collection of light rays crossing at least one patch of the plurality of patches of one of the at least one closed surface of the region for walkthrough, wherein the selected at least one representation of a collection of light rays includes all light rays needed for the image based rendering of a visible image at a selected point and viewing angle.

25. The computer sewer system of claim 24, further comprising:
an image component distributor, electrically coupled to the image server, for sending into the network the selected at least one representation of a collection of light rays destined for reception by, and for rendering the visible image at, the at least one networked computing device.

26. The computer server system of claim 24, wherein each of the at least one closed surface is of an arbitrarily chosen size.

27. The computer saver system of claim 24, wherein the size of each of the plurality of closed surfaces is selected to be a small size relative to the region for walkthrough so that the representation of a collection of light rays for each patch of each surface can be kept to within a predetermined size constraint.

28. The computer server system of claim 24, wherein the region for walkthrough is covered with a plurality of closed surfaces such that the volume enclosed by each does not intersect the volume enclosed by any other.

29. The computer server system of claim 28, wherein each of the plurality of closed surfaces comprises a rectangular solid.

30. The computer server system of claim 29, wherein each of the plurality of closed surfaces is divided into six patches that comprise six rectangular solid.

31. A computer system comprising:
a user interface for presenting imaging information to a user navigating a walkthrough;
a processor/controller, communicatively coupled to the user interface, for rendering the imaging information for the walkthrough using methods drawn from image based rendering;
a memory, communicatively coupled to the processor/controller, for storing imaging information comprising:
   a closed surface database including at least one representation of at least one closed surface, respectively, being located in a region for walkthrough; and
   a representation of a collection of light rays for each of a plurality of patches constituting the at least one closed surface covering the region for walkthrough; and
an image server, communicatively coupled to the processor/controller and to the memory, for selecting at least one representation of a collection of light rays crossing at least one patch of the plurality of patches of one of the at least one closed surface of the region for walkthrough, wherein the selected at least one representation of a collection of light rays includes all light rays needed for image based rendering of a visible image at a selected point and viewing angle.

32. The computer system of claim 31, wherein the size of each of the at least one closed surface is selected to be a small size relative to the region for walkthrough so that the representation of a collection of light rays for each patch of the at least one closed surface can be kept to within a predetermined size constraint.

33. A computer readable medium including computer instructions for an image serving system, the computer instructions comprising instructions for:

covering a region for walkthrough with at least one closed surface, wherein each point in the region is surrounded by at least one closed surface;

dividing each of the at least one closed surface into a plurality of patches such that each point of each of the at least one closed surface is contained within at least one patch; and providing a representation of a collection of light rays crossing each patch of the plurality of patches in a direction oriented toward the interior of a corresponding closed surface using image based rendering methods, wherein the representation of a collection of light rays for each patch being kept to within a predetermined size constraint.

34. The computer readable medium of claim 33, further including computer instructions for:

delivering, via a network interface, to a networked computer the selected at least one representation of the collection of light rays representing a visible image at a selected viewing point and viewing angle.

35. The computer readable medium of claim 33, wherein the size of each of the at least one closed surface is selected to be a small size relative to the region for walkthrough so that the representation of a collection of light rays for each patch of the at least one closed surface can be kept to within a predetermined size constraint.

36. The computer readable medium of claim 33, wherein the at least one closed surface is covered with a plurality of patches that are disjoint from one another and only intersecting at their boundaries.

37. The computer readable medium of claim 33, wherein the region for walkthrough is covered wit a plurality of closed surfaces such that the volume enclosed by each does not intersect the volume enclosed by any other.

38. The computer readable medium of claim 37, wherein each of the plurality of closed surfaces comprises a rectangular solid.

39. The computer readable medium of claim 38, wherein each of the plurality of closed surfaces is divided into six patches that comprise six rectangular boundaries for the rectangular solid.

40. The computer readable medium of claim 39, wherein the size of each of the at least one closed surface is selected to be a small size relative to the region for walkthrough so that the representation of a collection of light rays for each patch of the at least one closed surface can be kept to within a predetermined size constraint.

41. The computer readable medium of claim 33, wherein the at least one closed surface comprises at least one rectangular solid divided into six patches that comprise six rectangular boundaries for each of the at least one rectangular solid.

* * * * *

UNITED STATES PATENT AND TRADEMARK OFFICE
CERTIFICATE OF CORRECTION

PATENT NO. : 6,724,384 B2
DATED : April 20, 2004
INVENTOR(S) : Donald H. Weingarten It is certified that error appears in the above-identified patent and that said Letters Patent is hereby corrected as shown below:

Column 15,
Line 54, change "tat" to -- that --

Column 16,
Line 44, change "rectangular solid" to -- boundaries for the rectangular solid --

Column 18,
Line 10, change "wit" to -- with --

Signed and Sealed this

Sixth Day of July, 2004

JON W. DUDAS
*Acting Director of the United States Patent and Trademark Office*